United States Patent
Heinemann

(10) Patent No.: US 6,325,620 B1
(45) Date of Patent: Dec. 4, 2001

(54) METHOD OF REDUCING VOLATILE POLLUTANTS IN THE EXHAUST GASES FROM A HEAT EXCHANGER SYSTEM

(75) Inventor: Otto Heinemann, Ennigerloh (DE)

(73) Assignee: Krupp Polysius AG, Beckum (DE)

( * ) Notice: Subject to any disclaimer, the term of this patent is extended or adjusted under 35 U.S.C. 154(b) by 0 days.

(21) Appl. No.: 09/610,813

(22) Filed: Jul. 6, 2000

(30) Foreign Application Priority Data

Aug. 2, 1999 (DE) ............................................. 199 36 375

(51) Int. Cl.$^7$ ........................................................ F27B 15/12
(52) U.S. Cl. ................................ 432/16; 432/72; 110/345
(58) Field of Search ................................. 432/2, 16, 65, 432/72, 75; 110/203, 345

(56) References Cited

U.S. PATENT DOCUMENTS

| | | | |
|---|---|---|---|
| 4,047,884 | * 9/1977 | Heian | 432/72 |
| 4,715,811 | * 12/1987 | Lawall | 432/14 |
| 5,927,967 | * 7/1999 | Bauer et al. | 432/72 |
| 6,007,331 | * 12/1999 | Thomsen et al. | 432/58 |

FOREIGN PATENT DOCUMENTS

WO87/04698   8/1987   (WO).

* cited by examiner

Primary Examiner—Gregory Wilson
(74) Attorney, Agent, or Firm—Muramatsu & Associates

(57) ABSTRACT

In the method according to the invention for reducing volatile pollutants in the exhaust gases of a heat exchanger system for heating of cement raw meal or the like, partially preheated raw meal is heated to a temperature for release of the pollutants contained therein. In order to be able to achieve this with a reliable mode of operation and with relatively low investment costs, partially preheated raw meal is drawn off from an upper preheater stage and is mixed together in a mixing zone with a fraction of raw meal which is already highly heated and of such a size that the raw meal mixture which is obtained is set to a mixing temperature which releases the pollutants and as a result at least volatile sulphur oxides are incorporated into the raw meal mixture, whilst carbon monoxide formed in the course of this is led off by means of a carrier gas. The raw meal mixture containing the incorporated sulphur oxides is conveyed out of the mixing zone and introduced into a suitable preheater stage for further heating.

9 Claims, 1 Drawing Sheet

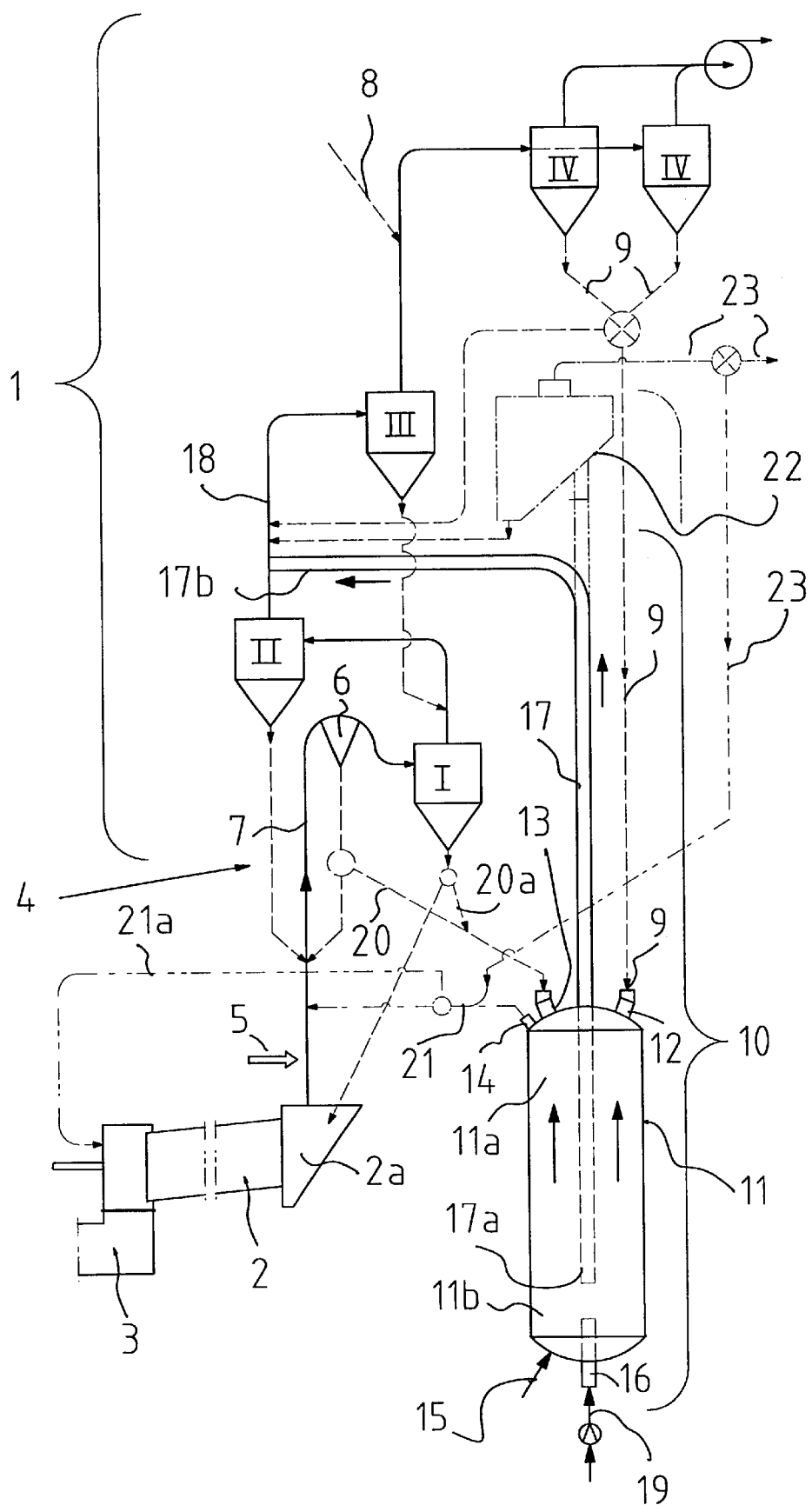

METHOD OF REDUCING VOLATILE POLLUTANTS IN THE EXHAUST GASES FROM A HEAT EXCHANGER SYSTEM

FIELD OF THE INVENTION

The invention relates to a method of reducing volatile pollutants which are released during the heating of cement raw meal or the like, in particular sulphur oxides, sulphur compounds and similar volatile compounds, in the exhaust gases from a heat exchanger system, according to the preamble to claim 1.

BACKGROUND OF THE INVENTION

It is generally known that during heating and burning of powdery raw materials, such as cement raw meal or the like, exhaust gases are produced in the gas suspension heat exchanger system which, depending upon the nature and origin of the raw materials contain a greater or lesser proportion of volatile pollutants, such as sulphur oxides, sulphur compounds and similar volatile compounds, which have been released during the heat treatment. Due to corresponding environmental protection requirements it is increasingly necessary to ensure that the emissions of the said pollutants in the exhaust gases from the heat exchanger are reduced. Efforts are therefore being made to develop appropriately or to extend the methods intended for heating and burning of the said raw materials (and the correspondingly designed apparatus and devices) with a view to reducing the said pollutant emissions in the exhaust gases from the heat exchanger.

SUMMARY OF THE INVENTION

Thus for example a method is known from WO87/04698 for reducing the emission of sulphur oxide formed during the heating of raw meal in a gas suspension preheater during cement manufacture and/or of volatile organic compounds in the exhaust gases from the heat exchanger. In this case in order to form and release the sulphur oxide from the sulphur compounds, the raw meal coming from the uppermost preheating stage is heated with at least one hot gas stream in a separate heating device to a temperature range of between 280 and 700° C., particularly between 380 and 500° C., and for this purpose this heating device is preferably provided with its own firing arrangements or burners. Whilst the exhaust gas from this heating device which is leaving the device and is enriched with sulphur oxide or the like can be subjected to secondary purification for precipitation of the pollutants and/or can be returned to the kiln system, the raw meal which is separated from it in a separator is delivered to a cyclone stage of the preheater so that it can be further heated in the usual way in this preheater. The heating device alone, which has to be provided additionally and which requires not only a corresponding heating section but also a suitable separator, corresponding control arrangements and in general its own firing arrangements, leads to extremely high additional design and investment costs; furthermore, this additional heating device requires relatively large quantities of hot gas and the space required for its installation is considerable.

The object of the invention therefore is to create a method of the type set out in the preamble to claim 1 which, on the one hand, is distinguished by a relatively marked reduction in the pollutant emissions in the exhaust gases from the heat exchanger and also by a reliable mode of operation and, on the other hand, by relatively low investment costs for the appertaining apparatus parts.

This object is achieved according to the invention by the method steps set out in the characterising portion of claim 1.

Advantageous embodiments of the invention are set out in the subordinate claims.

In the method according to the invention, first of all, in a first method step, at least a part-quantity of the raw meal preheated to approximately 300 to 400° C. is drawn off from at least one upper preheater stage and is mixed together in a mixing zone with a selectable fraction of raw meal which is already highly heated and of such a size that the raw meal mixture obtained is adjusted to a mixing temperature which releases the pollutants and in the course of this at least volatile sulphur oxides, particularly sulphur dioxide ($SO_2$), are bound to calcium oxide (CaO) contained in the highly heated raw meal and converted into calcium sulphate ($CaSO_4$) and/or similar gypsum compounds, whilst at least any carbon monoxide (CO) formed here is removed from the raw meal mixture by means of a carrier gas. Thus due to the mixing together of the two said raw meal fractions the raw meal mixture which is formed is brought to a mixing temperature which corresponds to the volatilisation or expulsion temperature for the pollutants. Thus this can be carried out in a mixing zone of relatively simple construction and with the aid of a correspondingly large fraction, which can be drawn off simply, of the raw meal which is already highly preheated—for example in the lowest stage of the gas suspension preheater and/or in a calcination zone disposed downstream thereof—as a result of which additional hot gas heating sections, firing and burner arrangements and the like which—by comparison with the known construction described in the introduction—are costly and require a great deal of space are avoided.

In the mixing zone which is provided according to the invention, due to the setting of the necessary mixing temperature of the raw meal mixture which is formed, sulphur dioxide and other pollutants contained n the delivered raw meal are volatilised or released, so that the sulphur oxides which are released or formed, particularly sulphur dioxide ($SO_2$), is immediately bound to the calcium oxide (CaO), which has been brought into the mixing zone with the raw meal fraction which has already been highly heated and at least partially calcined, and converted to gypsum or corresponding gypsum compounds, particularly calcium sulphate ($CaSO_4$). The fraction of the raw meal which has already been highly heated and is to be introduced into this mixing zone is advantageously of such a size that, on the one hand, this fraction is large enough for the partially preheated raw meal fraction delivered from an upper preheating stage to be brought to the necessary mixing temperature; on the other hand, however, care must be taken to ensure that this fraction of the highly heated raw meal contains a sufficient quantity of CaO or CaO particles in order to be able to bind all released sulphur oxides in the mixing zone and to convert them in the aforementioned manner.

Carbon monoxide (CO) volatilised in this mixing zone and similar volatile combustible substances, in so far as they are formed or released in the mixing zone, are essentially not incorporated into the raw meal mixture and can be drawn off out of this mixing zone in a relatively simple manner with a carrier gas stream.

According to a further method step according to the invention the raw meal mixture together with the sulphur oxides is conveyed out of the mixing zone and for it to be further heated and at least partially calcined it is introduced into a preheater stage, the temperature of which is higher than in the upper preheater stage from which the partially preheated raw meal has previously been drawn off. Thus the sulphur oxides incorporated into the raw meal mixture or the gypsum fractions thereof are introduced into a corresponding preheater stage and proceed—during the further preheating and calcining of this raw meal mixture—through the rest of the preheater and into the kiln, since the gypsum containing the sulphur oxides is stable in the further heating process. Thus this means that the pollutants which are released, formed or converted in the mixing zone in the manner according to the invention can be drawn off or passed on in an extremely reliable manner so that emission thereof into the exhaust gases from the gas suspension preheater[1] can be prevented in a relatively simple and yet very reliable manner.

In a method in which the gas suspension preheater is a cyclone preheater with a plurality of cyclone stages which are disposed substantially one above the other and in which the cement raw meal is heat-treated at temperatures which increase from the top downwards, and in which the highly preheated cement raw meal coming out of the lowest cyclone stage is preferably first of all at least largely calcined or precalcined in a calcination zone before it is introduced into the kiln, it is particularly advantageous according to the invention if at least the majority of the raw meal preheated in the uppermost cyclone stage is introduced with a temperature of approximately 310 to 380° C. into the mixing zone and, with highly heated raw meal mixed together with it, is heated in a controllable manner to a mixing temperature of approximately 370 to 600° C., preferably approximately 400 to 550° C., which corresponds to the pollutant volatilisation temperature.

In a further advantageous embodiment of this method according to the invention a conveying container of a pneumatic conveyor arrangement for a high load of solid material in the conveying air is essentially used as the mixing zone. In this case the somewhat preheated raw meal from the uppermost preheater stage and the highly heated raw meal fraction are delivered to this conveying container at its upper end, and aerating gas (preferably aerating air) on the one hand and conveying air on the other hand are delivered at the lower end of the conveying container. In this case, furthermore, the raw meal mixture which is heated in this way is conveyed by means of the conveying air into the corresponding preheater stage via a conveying pipe which protrudes with its lower end into the region of the lower end of the conveying container, whilst the aerating gas together with volatile pollutants, particularly carbon monoxide (CO), suspended therein are drawn off from the upper end of the conveying container.

As will become apparent later from the explanation of an embodiment of apparatus adapted for carrying out the method according to the invention, according to a further embodiment of the invention it is also particularly advantageous if preheated conveying air is delivered to the conveying container of the pneumatic conveyor arrangement and the pneumatic conveying arrangement is used in a sufficiently heat-resistant construction and preferably in the form of an elevator—which is known per se. Such pneumatic conveyor arrangements and in particular pneumatic elevators can be used in a commercially available and therefore economical construction.

In the conveying container of such a pneumatic conveyor arrangement and particularly of such a pneumatic elevator the material delivered from above, that is to say in this case the raw meal or cement raw meal, is fluidised in a known manner with the aid of the aerating gas and is thereby simultaneously largely homogenised or mixed. The lower end of an appertaining conveying pipe opens at a relatively short distance above the conveying air feed nozzle, so that the conveying air which remains substantially free of pollutants carries along the aerated or fluidised raw meal into the conveying pipe and thus conveys it in suspension into the corresponding upper region of the preheater. The aerating gas on the other hand proceeds substantially separately from the conveying air upwards through the column of raw meal within the conveying container and thus carries along the pollutants which are volatilised at the said mixing temperature and are not incorporated into the raw meal mixture, so that this aerating air which is loaded with pollutants can be drawn off from the upper end of the conveying container—without special precipitation measures—and conveyed to the corresponding destination.

Thus precisely due to the use according to the invention of the pneumatic conveying arrangement several aims and advantages can be achieved: First of all—as already mentioned—in the conveying container which is in any case present in this pneumatic conveyor arrangement, during the fluidisation of the raw meal which is only somewhat preheated coming from the uppermost preheater stage and of the raw meal which is already highly heated, the desired intensive intermixing of these two raw meal streams with different levels of heating is simultaneously achieved so that the raw meal mixture which is obtained can be set or heated extremely evenly to the desired mixing temperature, that is to say to the necessary volatilisation or release temperature for the pollutants. The volatilised pollutants such as for example CO and, if applicable, volatile combustible substances, are drawn off upwards together with and suspended in the aerating gases which are led upwards as usual out of the conveying container. As a result of this the raw meal mixture, which is largely or completely freed of the aforementioned volatilised pollutants and contains sulphur oxides bound in it, proceeds in the fluidised state into the lower end region of the conveying container where—as is known per se—the conveying air entering centrally and axially carried it along into the lower end of the conveying pipe which is located there and is conveyed—substantially vertically—upwards into the corresponding discharge region of the cyclone preheater. As is generally known in the art, a pneumatic conveyor arrangement of the aforementioned type can be operated with a relatively small quantity of conveying air, so that even when this conveying air has fulfilled its conveying purpose it can still be easily handled. It is also known in this case that the appertaining conveying container is of relatively slim and space-saving construction and accordingly the entire pneumatic conveyor arrangement too can be integrated in an extremely space-saving and uncomplicated manner into a corresponding installation—and indeed even into an existing installation. Finally, such a pneumatic conveyor arrangement, particularly in the form of a so-called pneumatic elevator, can be self-regulating and can be operated substantially without mechanically moved apparatus parts.

BRIEF DESCRIPTION OF THE DRAWING

The attached drawing is a schematic diagram showing an apparatus for carrying out the method of the present invention.

The invention will be explained in greater detail below with reference to an embodiment of apparatus which is particularly adapted for carrying out the method according to the invention and is illustrated as a simplified apparatus diagram in the single FIGURE of the drawings.

DETAILED DESCRIPTION OF THE INVENTION

The example of apparatus for carrying out the method according to the invention which is illustrated in this drawing comprises in a manner which is known per se first of all a multi-stage gas suspension preheater which is preferably constructed in the form of a cyclone preheater 1, also a kiln in the form of a rotary kiln 2 as well as a cooler 3 disposed downstream of this rotary kiln 2, and furthermore a calcination zone 4 is constructed or disposed in the region between the cyclone preheater 1 and the rotary kiln inlet 2a. The suspension gas preheater or cyclone preheater 1 is constructed with a plurality of (four in the illustrated embodiment) cyclone stages I, II, III and IV disposed substantially one above the other, of which the lowest cyclone stage I simultaneously forms a precipitation stage for the calcination zone 4. The preheater or cyclone stages I, II, III and IV which are numbered upwards from the bottom have the exhaust gases from the calcination zone 4 flowing upwards from the bottom through them in succession, whilst in particular the exhaust gases coming out of the rotary kiln 2 or the inlet end 2a thereof are delivered to the calcination zone 4, fuel being advantageously added in the usual way—at 5—to these kiln exhaust gases. In a tubular calcination section which initially rises and is then turned round via a gravity separator 6 or the like, sufficiently preheated cement raw meal is calcined in the conventional manner and is then precipitated in the lowest cyclone stage I. The starting raw meal which is delivered according to the arrow 8 shown by a broken line is delivered with the aid of the rising exhaust gases from the second-uppermost cyclone stage III to the uppermost cyclone stage IV and thereby subjected to a first intensive heat treatment or preheating, whereupon this raw meal (arrows 9) which is partially preheated in the uppermost cyclone stage IV is separated off from the exhaust gases.

Depending upon the type and origin of the cement raw materials for the starting raw meal, it contains more or less large proportions of pollutants, such as for example sulphur oxides, sulphur compounds, combustible organic substances and the like. As has already been mentioned in the introduction, the volatile pollutants released during the heating of the cement raw meal must be reduced as far as possible and in accordance with the environmental protection requirements in the exhaust gases from the heat exchanger system, that is to say here in particular the cyclone preheater 1, or they must be eliminated as far as possible. For this purpose the example of apparatus which is illustrated in the drawing and is particularly preferred contains as an essential further apparatus part a pneumatic conveyor arrangement which is constructed in a particularly preferred manner in the form of a so-called "elevator" 10 which is essentially commercially available and is known per se.

In a manner which is known per se, this pneumatic elevator 10 comprises a conveying container 11 which has at its upper end 11a a feed pipe 12 for partially preheated raw meal from an upper cyclone stage and a second feed pipe 13 for raw meal which is already highly heated and also a discharge connection 14 for aerating gas, whilst at its lower end 11b it has a feed indicated by the arrow 15 for aerating gas and a feed connection 16 for conversing air which protrudes centrally and axially from below into the lower end 11b of the container. In the opposite direction to this, a conveying pipe 17 protrudes essentially coaxially and centrally from above into this conveying container 11, and the lower end 17a of the said conveying pipe extends into the lower end 11b of the container and ends at an appropriate distance open above the generally nozzle-shaped upper end of the tubular conveying air feed connection 16. As is shown by solid lines, the tipper end 17b of the conveying pipe 17 can be directly connected to the hot gas pipe 18 leading to the second uppermost cyclone stage III. The conveying container 11 of such a pneumatic conveying arrangement 10 is—as is generally known—preferably provided as a container which is of relatively slim, cylindrical and therefore space-saving construction and in the present case is preferably produced with sufficient heat resistance so that—as will be explained—it can be operated without problems at the elevated temperatures occurring therein. Preheated conveying air is preferably delivered as conveying air (arrow 19)—and if applicable as aerating gas or aerating air 15. Such pneumatic conveying containers 11 or pneumatic conveying arrangements 10, overall, can be operated relatively favourably without mechanically moved parts and so as to be self-regulating.

With reference to the method according to the invention which has already been described above, the following may be said concerning the mode of operation of the previously described apparatus which is illustrated in the drawing:

First of all it should be pointed out that in the illustrated apparatus diagram the hot gas pipes and exhaust gas pipes are represented by thick solid lines, whilst the actual raw meal or material pipes are shown by thin broken lines, wherein the hot gas or exhaust gas pipes and the raw meal or material pipes connect the rotary kiln 2, calcination zone 4, cyclone stages I to IV and the conveying container 11 of the pneumatic conveyor device 10 to one another in an appropriate manner.

With the previously described constriction of the illustrated apparatus, this apparatus can be operated so that—depending upon the type and origin of the cement raw material and of the pollutants contained therein—at least a greater part-quantity of the raw meal (arrows 9) which is partially preheated to approximately 300 to 400° C., preferably approximately 310 to 380° C., but as a rule preferably all of the preheated raw meal (arrows 9) is drawn off and introduced through the feed pipe 12 into the conveying container 11 from above. If the nature of the raw material is appropriate, it could also be advantageous for a selectable proportion of the partially preheated raw meal from the second-uppermost cyclone stage III likewise to be delivered to the mixing zone or for a selectable small proportion of the raw meal 9 from the uppermost cyclone stage IV to be delivered to the subsequent cyclone stage III. In each case, however, a selectable or adjustable fraction of raw meal which is already highly heated is simultaneously introduced—according to the broken lines 20 or 20a—into the upper end 11a of the conveying container 11. This raw meal or hot meal which is heated—for example to approximately 750 to 850° C.—is advantageously drawn off—through corresponding adjustable distribution arrangements (as indicated)—out of the lowest preheater or cyclone stage I and/or out of a recirculation region of the calcination zone 4, i.e. this highly heated raw meal is already partially deacidified or largely deacidified—at correspondingly high temperatures. The conveying container 11 or the interior thereof now forms a mixing zone in which the partially preheated raw meal originating from the uppermost cyclone stage IV and the fraction of highly heated raw meal are immediately mixed together intensively—particularly by the action of the aerating gas (aerating air). As has already been explained above, the fraction of highly heated raw meal introduced into the conveying container 11 is of Such a size that the raw meal mixture which is forming or is formed is set to a mixing temperature which releases the pollutants and thereby at least volatile sulphur oxides, particularly $SO_2$ are bound to the calcium oxide (CaO)—formed by the at least partial calcination—(conversion in particular into CaSO₄). The sulphur oxides which are thus incorporated into the entire raw meal mixture are then pneumatically conveyed in this raw meal mixture with the aid of the conveying air through the conveying pipe 17 into the gas pipe 18 and introduced from there directly into the second-uppermost cyclone stage III of the preheater 1 in which the treatment or preheating temperature, as is known, is higher than in the uppermost cyclone stage IV from which the partially preheated raw meal has been previously led off into the conveying container 11. The volatile carbon monoxide (CO) formed during the mixing together in the conveying container 11 and any further volatile combustible substances formed in the course of this are not incorporated into the raw meal mixture but are carried along upwards by the aerating gases (aerating air) rising in the conveying container 11 and are led off—as a corresponding gas suspension—through the discharge connection 14 according to the lines 21, 21a respectively which are shown by dash-dot lines. The aerating gases, which act to some extent as carrier gas, can now together with the volatile pollutants suspended therein be introduced in a relatively simple manner—as indicated in the apparatus diagram—selectively into the calcination zone 4 and/or directly into the combustion zone of the rotary kiln 2, or they can also if applicable be completely or partially removed from the combustion process and delivered to a separate purification process or to a suitable combustion arrangement. In any case the exhaust gases leaving this heat exchanger system or this cyclone preheater 1 at the upper end are no longer loaded with CO and any other volatile pollutants drawn off in these aerating gases.

With regard to the handling of the conveying air with which the raw meal mixture has been conveyed via the gas pipe 18 into the second-uppermost cyclone stage III, then in the mode of conveying and operating which has been explained and illustrated by the solid lines the procedure is such that the conveying air and the raw meal mixture conveyed thereby are introduced jointly into this second-uppermost cyclone stage III. This is possible because the pneumatic conveyor arrangement 10 operates with a relatively high load of solid material or raw meal in the conveying air and therefore this load does not place an excessive strain on the upper end of the cyclone preheater 1. However, this handling of the conveying air is generally only acceptable if the raw meal mixture is largely free of CO and any combustible substances and consequently there is no unwanted loading of the exhaust gases leaving the preheater 1.

However, if the raw meal mixture conveyed upwards out of the conveying container 11 contains combustible volatile constituents or if at least carbon monoxide is formed during this conveying in the conveying pipe 17, then it must be ensured that this CO and any other combustible volatile constituents are not carried along into the gas pipe 18 and thus into the second-uppermost cyclone stage III. In this case, therefore, it is advantageous—as sketched in by dash-dot lines in the apparatus diagram—for the upper end of the conveying pipe 17 to lead into a suitable separator, for example a cyclone separator or—as shown—a gravity separator 22, in which the raw meal mixture is separated off from the conveying air and the volatile constituents suspended therein. The precipitated raw meal mixture can then be delivered to the gas pipe 18 and thus in turn to the second-uppermost cyclone stage III. The conveying air containing the volatile pollutants can now be selectively either drawn off separately into a suitable separating or filter arrangement or brought together with the suspension of aerating gases and pollutants coming out of the conveying container 11 and passed on. Thus in this case it is also ensured that no volatile pollutants proceed with the conveying air into the exhaust gases from the cyclone preheater 1.

In a series of tests based on the apparatus diagram described above and using the method according to the invention it was possible to establish that first of all in the normal mode of operation, i.e. without the mixing together according to the invention of raw meal which is only partially preheated and raw meal which is already highly heated, in fact by suitable temperature graduations for instance in the region of the second-uppermost cyclone stage of the preheater a reduction in the emissions of volatile pollutants in the exhaust gases from the heat exchanger to below 1000 mg $SO_2/Nm^3$ can be achieved after the uppermost cyclone stage. The tests subsequently carried out using the method according to the invention (with apparatus corresponding to the example of the apparatus explained above), i.e. utilising the mixing zone in which partially preheated raw meal has been mixed together with a correspondingly large fraction of raw meal which is already highly heated, showed however that a considerably marked further reduction in the volatile $SO_2$ emissions could be achieved, i.e. the $SO_2$ emissions into the exhaust gases from the heat exchanger were found in some tests to be below 300 mg $SO_2/Nm^3$ (at 10% $O_2$) after the uppermost cyclone stage, whilst in further tests it was not even possible even to detect any $SO_2$ emissions after the uppermost cyclone stage. Therefore the method according to the invention makes possible a very far-reaching reduction of unwanted volatile pollutants, particularly sulphur oxides and the like, in the exhaust gases from heat exchanges or gas suspension preheaters during the heating of cement raw meals or the like. This can be achieved with extremely reliable operation and relatively low investment costs and with relatively little additional space required not only in new apparatus but also in already existing apparatus.

What is claimed is:

1. Method of reducing volatile pollutants which are released during the heating of cement raw meal, in particular sulphur oxides, sulphur compounds, combustible organic substances and the like, in the exhaust gases from a heat exchanger system, wherein the raw meal is preheated in stages in a multi-stage gas suspension preheater (1) with the hot exhaust gases from a kiln (2) and is at least partially calcined before it is fed into the kiln and fired therein, and wherein partially preheated raw meal is brought to a temperature at which the pollutants contained in the raw meal are released, characterized by the following method steps:

a) at least a part-quantity of the raw meal (9) preheated to approximately 300 to 400° C. is drawn off from at least one upper preheater stage (IV) and is mixed together in a mixing zone (11) with a selectable fraction of raw meal which is already highly heated and of such a size that the raw meal mixture obtained is set to a mixing temperature which releases the pollutants and in the course of this at least volatile sulphur oxides, particularly sulphur dioxide ($SO_2$), are bound to calcium oxide (CaO) contained in the highly heated raw meal and converted into calcium sulphate ($CaSO_4$) and similar gypsum compounds, whilst at least any carbon monoxide (CO) formed here is removed from the raw meal mixture by means of a carrier gas;

b) the raw meal mixture together with the sulphur oxides is conveyed out of the mixing zone and for it to be further heated and at least partially calcined it is introduced into a preheater stage (III), the temperature of which is higher than in the upper preheater stage (IV) from which the partially preheated raw meal has previously been drawn off.

2. Method as claimed in claim 1, in which the gas suspension preheater is a cyclone preheater (1) with a plurality of cyclone stages (I to IV) which are disposed substantially one above the other and in which the cement raw meal is heat-treated at temperatures which increase from the top downwards, and in which the highly preheated cement raw meal coming out of the lowest cyclone stage (I) is preferably first of all at least largely calcined or precalcined in a calcination zone (4) before it is introduced into the kiln (2), characterised in that at least the majority of the raw meal (9) preheated in the uppermost cyclone stage (IV) is introduced with a temperature of approximately 310 to 380° C. into the mixing zone (11) and, with highly heated raw meal mixed together with it, is heated in a controllable manner to a mixing temperature of approximately 370 to 600° C., preferably approximately 400 to 550° C., which corresponds to the pollutant volatilisation temperature.

3. Method as claimed in claim 1, characterized in that a conveying container (11) of a pneumatic conveyor arrangement (10) for a high load of solid material in the conveying air is essentially used as the mixing, zone, wherein the partially preheated raw meal (9) from the uppermost preheater stage (IV) and the highly heated raw meal fraction are delivered to this conveying container at its upper end (11a), and aerating gases on the one hand and conveying air on the other hand are delivered at the lower end (11b) of the conveying container, and wherein the raw meal mixture is conveyed by means of the conveying air into the corresponding preheater stage (III) via a conveying pipe (17) which protrudes with its lower end (17a) into the region of the lower end (11b) of the conveying container, whilst the aerating gases together with volatile pollutants suspended therein are drawn off from the upper end (11a) of the conveying container.

4. Method as claimed in claim 3, characterised in that the aerating gases (21, 21a) drawn off from the conveying container (11) together with the pollutants suspended therein are introduced selectively into the calcination zone (4) and directly into the combustion zone of the rotary kiln (2), or they can be completely or partially removed from the combustion process and delivered to a separate purification process.

5. Method as claimed in claim 3, characterised in that the conveying air and the raw meal mixture conveyed by it are introduced jointly into the corresponding preheater stage (III).

6. Method as claimed in claim 3, characterised in that the partially preheated raw meal (9) to be delivered to the conveying container (11) is essentially removed only from the uppermost preheater stage (IV) and the heated rats meal mixture from the conveying container (11) is conveyed into the region of the second-uppermost preheater stage (III) is precipitated there out of the conveying air and introduced into this preheater stage (III), whilst the conveying air (23) which is separated off is either drawn off separately or is brought together with the suspension of aerating, gases and pollutants coming from the conveying container.

7. Method as claimed in claim 3, characterised in that preheated conveying air is delivered to the conveying container (11) of the pneumatic conveyor arrangement (10) and the pneumatic conveying arrangement is used in a sufficiently heat-resistant construction and preferably in the form of a pneumatic elevator.

8. Method as claimed in claim 3, characterized in that the aerating gases (21, 21a) drawn off from the conveying container (11) together with the pollutants suspended therein are introduced selectively into the calcination zone (4) or directly into the combustion zone of the rotary kiln (2), or they can be completely or partially removed from the combustion process and delivered to a separate purification process.

9. Method of reducing volatile pollutants which are released during the heating of cement raw meal, in particular sulphur oxides, sulphur compounds, combustible organic substances and the like, in the exhaust gases from a heat exchanger system, wherein the raw meal is preheated in stages in a multi-stage gas suspension preheater (1) with the hot exhaust gases from a kiln (2) and is at least partially calcined before it is fed into the kiln and fired therein, and wherein partially preheated raw meal is brought to a temperature at which the pollutants contained in the raw meal are released, characterized by the following method steps:

a) at least a part-quantity of the raw meal (9) preheated to approximately 300 to 400° C. is drawn off from at least one upper preheater stage (IV) and is mixed together in a mixing zone (11) with a selectable fraction of raw meal which is already highly heated and of such a size that the raw meal mixture obtained is set to a mixing temperature which releases the pollutants and in the course of this at least volatile sulphur oxides, particularly sulphur dioxide ($SO_2$), are bound to calcium oxide (CaO) contained in the highly heated raw meal and converted into calcium sulphate ($CaSO_4$) or similar gypsum compounds, whilst at least any carbon monoxide (CO) formed here is removed from the raw meal mixture by means of a carrier gas;

b) the raw meal mixture together with the sulphur oxides is conveyed out of the mixing zone and for it to be further heated and at least partially calcined it is introduced into a preheater stage (III), the temperature of which is higher than in the upper preheater stage (IV) from which the partially preheated raw meal has previously been drawn off.

* * * * *